INVENTOR
SOLO BAR

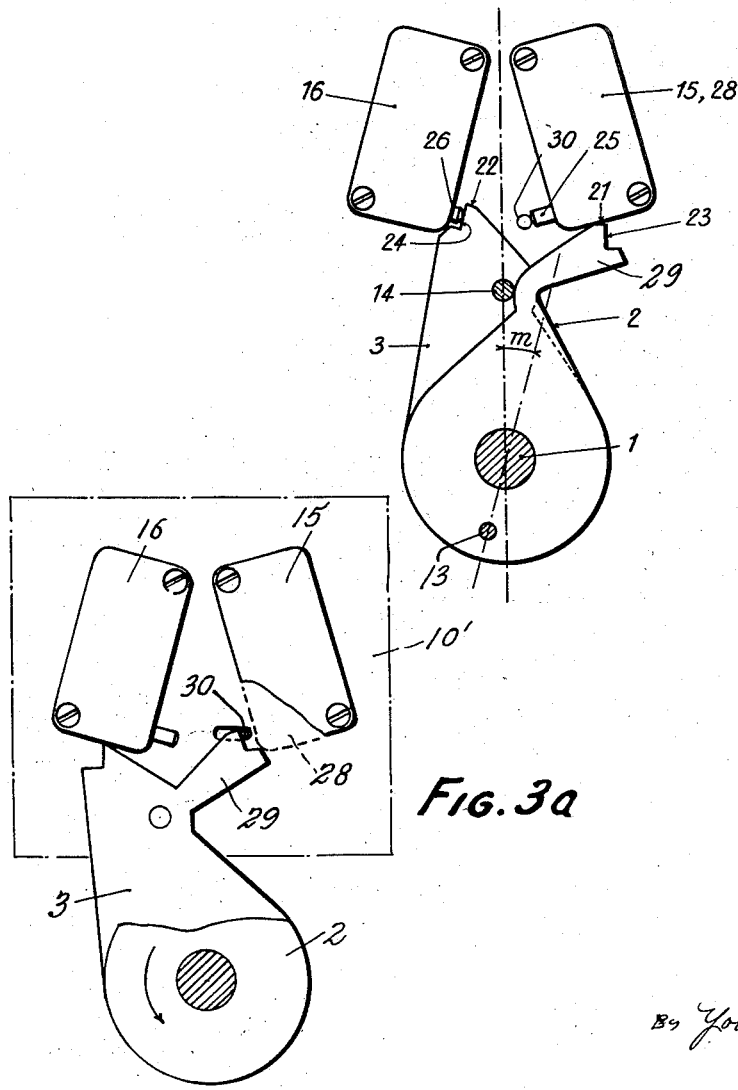

United States Patent Office 2,849,553
Patented Aug. 26, 1958

2,849,553

DIFFERENTIAL METERING MECHANISM WITH PRE-SELECTION

Solo Bar, Paris, France

Application July 5, 1955, Serial No. 520,066

Claims priority, application France July 8, 1954

9 Claims. (Cl. 200—47)

The present invention relates to a differential metering mechanism with pre-selection, which mechanism is adapted to be used quite generally for measuring all kinds of quantities (lengths, volumes, times, etc.), for determining a quantity in advance, and for obtaining its output, with stoppage of movement as soon as the desired quantity has been reached.

It also permits of initiating any action and of maintaining it for a specified time, and then of stopping it after the elapse of this time, it being possible for the operation to be repeated indefinitely, without it being necessary for the meter to be regulated each time.

In the particular application to magnetic recorders and dictating machines, which application has been selected as an example, and to which the following description has been directed, the device according to the invention in particular enables the start of each dictated letter to be marked and, on rewinding, it automatically stops the machine at the start of the last letter dictated. It also permits of "blocking" or placing in reserve any desired part of the recorded text. By this is meant that any part of the recording medium may be reserved, as when the machine is rewound to repeat the last-dictated letter, the machine will stop automatically at the beginning of that letter and not run back into other previously-dictated letters.

Furthermore, in contrast to meters with which certain existing dictating machines are equipped, it has the advantage of enabling the commencement of the dictation to be easily found again without having to take notes. To this end, it is sufficient for the indexes on the two discs constituting the device to be brought into coincidence.

The return to zero is also very simple and rapid; it is effected by the graduated disc being moved up to a stop by a single movement.

The device according to the invention also makes it possible for the secretary to cancel out, by remote control, the blocking of the text in the case where the person dictating may have forgotten to do this himself, and thus to return to start of the message or text.

In the conventional timing mechanisms at present known, and at least for setting complex devices into operation, it is necessary before the commencement of each measuring process to wind the timing mechanism by bringing its index to the mark corresponding to the required duration of the process to be controlled. If the latter is frequently repeated, this operation is tedious and involves the dangers of errors occurring. On the contrary, with the differential metering mechanism according to the invention, it is possible for the required duration to be initially regulated once, and it is then sufficient, with each commencement of the process, for the dial thereof to be moved up to its stop without having to be concerned with the setting figure, this ensuring great precision and uniformity of the quantities successively obtained.

Connected by suitable means to a rotatable member, for example a winding bobbin or roller for any suitable material, it is possible for the rotation thereof to be stopped at a point fixed in advance and for this point to be found again after the said material has been rewound. It also permits any points which may be desired to be successively found again on rewinding the material previously unwound.

The differential metering mechanism with preselection which forms the subject of the invention is essentially characterised by the combination of two switches with two control cams mounted with light friction on a single shaft, the rotation of which is controlled by the movement to be checked, and two operating and recording discs or dials, each fast in rotation with one of the two cams, one of which actuates the corresponding switch at the end of its travel and the other cam actuating the other switch at the end of its travel in the opposite direction.

According to the invention, moreover, one of the two concentric discs forms a dial and carries a scale graduated in units related to the measured quantity, while the other comprises one or more holes, pins, notches or the like presenting means in which a finger may be engaged and enabling the said disc to be rotated until it meets a stop. It is preferred to use a continuous series of holes or notches distributed uniformly at the periphery of the disc in such manner that the disc may always be engaged at substantially the same point, whatever may be its angular position, so that the movement of the finger is always in a downward direction, this being the most convenient and natural movement.

This control by rotation in reverse with abutment against a stop also has the great advantage of not requiring any particular attention and of even being carried out in the dark in a very rapid manner. It obviates errors in the event of numerous repetitions.

The device according to the invention will now be described in detail by reference to the accompanying drawings, which show it applied to a dictating machine using a magnetic wire, it being well understood that this particular application is only given by way of an illustrative example:

In these drawings:

Fig. 3a shows another position of the mechanism;

Fig. 7 shows the same cams when they have reached the end of their travel.

Figure 1:
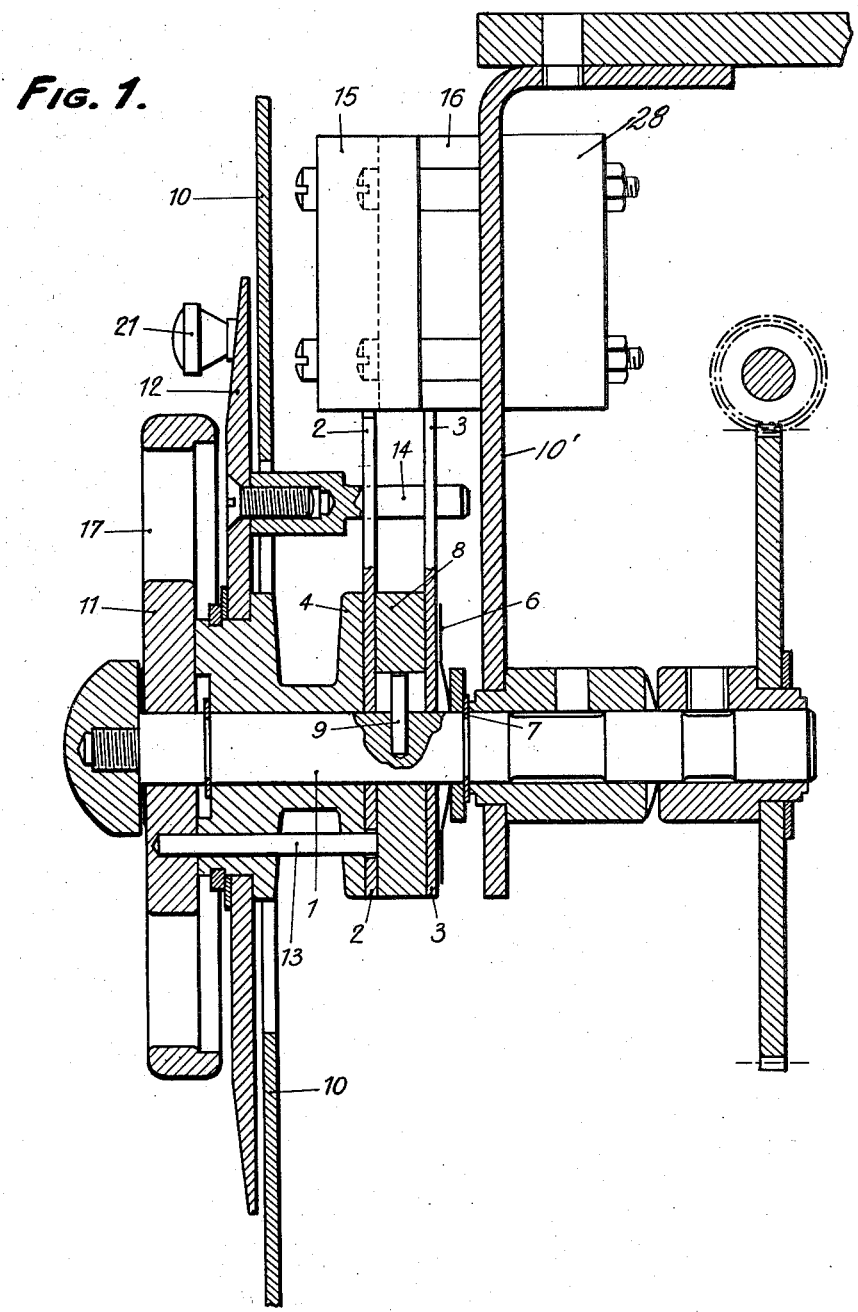
Fig. 1 is a partial vertical longitudinal section of the device in question.

Referring first of all to Fig. 1, it will be seen that the shaft 1, the rotation of which is related to the movement to be measured and controlled, in this case the unwinding of a recording magnetic wire, has two cams 2 and 3 mounted thereon with light friction. For this purpose, they are clamped together between a shoulder 4, on the one hand, and a resilient washer 6 held by a circlip or split ring 7, on the other hand. Interposed between these two cams is a friction ring 8, for example, made of fibre, this ring being connected to the shaft 1 by the stud 9.

Externally of the casing 10 of the mechanism, the said shaft 1 also carries a disc 11 and a dial 12. The disc 11 secured on the shaft 1 against movement axially thereof, turns freely on the said shaft and is positively solid in rotation with the cam 2 by means of the pin 13 engaged in a corresponding hole of the said cam. The dial 12 is adapted to turn freely on the boss of the disc 11, and carries a finger 14 which extends into the path of the two cams 2 and 3, may engage one or other edge of the cam 2 and projects into a corresponding hole of the cam 3.

The device is completed by the two switches 15 and 16 mounted on the fixed support 10'.

Figure 4:
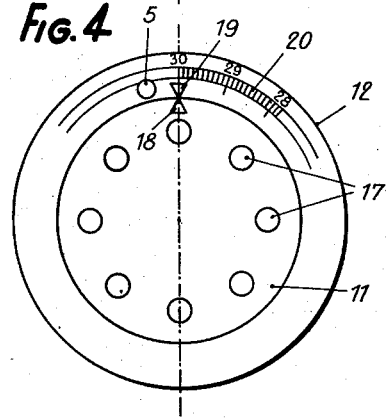
Fig. 4 shows the operating discs or dials in the same position.

Fig. 4 shows that the disc 11 is formed with a series of holes 17 in the manner of a telephone dial and also an index 18. The dial 12 carries a corresponding index 19 and a scale 20 graduated in units corresponding to the quantity in question, these being minutes in the embodiment described herein. This dial 12 is also provided with an operating button 5.

The cams 2 and 3 are given the particular contour which is illustrated. They each comprise a portion 21—22 by which they are able to bear against the casing of the associated switch 15 or 16 and a nose 23 or 24 by which they are able to act on the plunger 25 or 26 of the switch, and also a surface 24' or 25' limiting the control travel of the plungers 25 and 26 of the switches 15 and 16.

Figure 2:
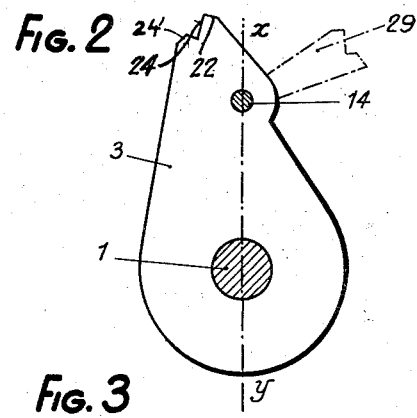
Fig. 2 shows one of the two cams.
Figure 2A:
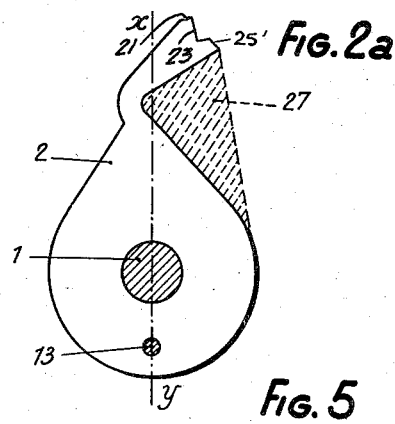
Fig. 2a shows the other cam.

It will be noted that with the arrangement chosen according to the invention, the cams are symmetrical with respect to the mean axis x—y, as indicated in Figures 2 and 2a, and that, consequently, the two cams may be blanked with the same die, the cross-hatched portion 27 of the cam 2 being cut out by means of a supplementary punch.

Figure 3:
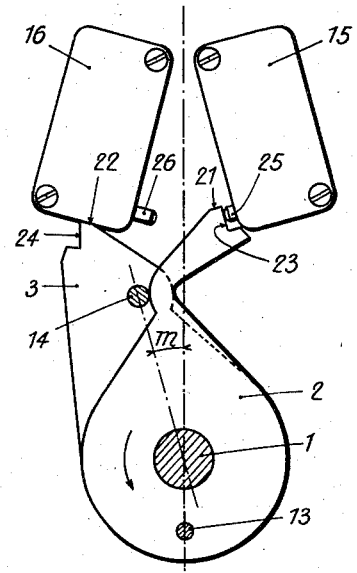
Fig. 3 shows the mechanism consisting of cams and switches in the starting position.

The operation of the device which has been described and illustrated is as follows:

Figures 3 and 4 indicate the starting or initial position at which the two indexes 18 and 19 are in coincidence. At this position, the nose 23 or the cam 2, which will be referred to as the "rewind cam," bears against the plunger or button 25 of the rewind switch 15, and the portion or nose 22 of the cam 3, which will be referred to as the "advance cam," bears against the body of the advance switch 16.

Figure 5:
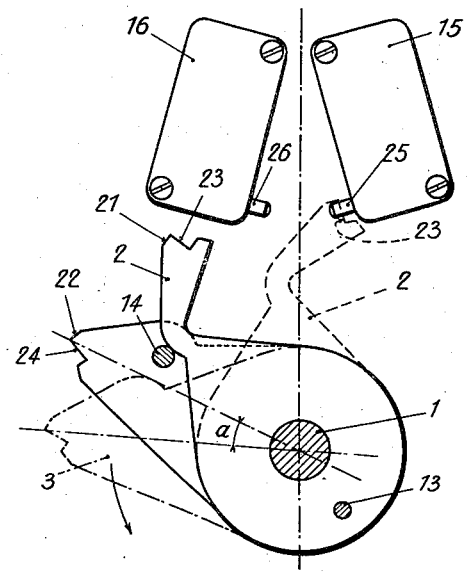
Figs. 5 and 6 are views corresponding to Figs. 3 and 4 but at an intermediate position of the mechanism.

At this position, the magnetic wire may be unwound normally and the dictation may be carried out, the shaft 1 turning towards the left and driving the two cams, the disc 11 and the dial 12 together in a single movement until the completion of this first dictation, when the cams will occupy, for example, the position indicated in full lines in Figure 5.

At the end of this first dictation, the dial 12 is displaced the same amount, with respect to the index 31, as cam 2, and the scale 20 carried by this dial 12 indicates the time still available for dictation. In another embodiment, where the scale 20 is placed on the dial in the opposite sense, this index 31 indicates the time of dictation already elapsed.

If the disc 11 is now caused to turn towards the right by a downward movement of the finger engaged in one of the holes 17, this disc will drive the rewind cam 2 by means of its pin 13 until the said cam strikes against the button 25 of the rewind switch 15 at that time not in the circuit because the rewind button or key of the machine has not been lowered (position shown in broken lines in Figure 5).

Figure 6:
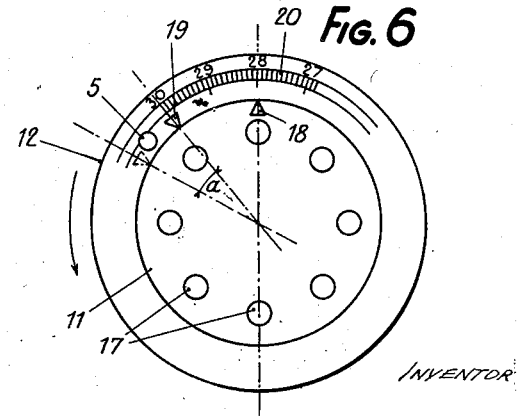

The dial 12 and the advance cam 3, however, are not affected by this rewind movement and the disc 11 thus assumes the relative position shown in Figure 6 in relation to the dial 12, this figure showing by the index 31 that this first dictation has lasted, for example, two minutes.

If another letter is now dictated, the two cams and the two discs will now be displaced towards the left until this second recording is completed.

By operating the rewind button or key of the machine, the rewind switch 15 is placed in circuit and, when the rewind cam 2 again comes into contact with the button 25, this switch will act to stop the mechanism. The first recording corresponding to the graduations 30—28 of the scale 20 has thus been placed in reserve or blocked.

It will be seen therefore that the purpose of the disc 11 associated with the cam 2 is to limit, each time, the movement of the return of the mechanism to the beginning of the last movement.

The relative position of the members is then that indicated in Figures 5 and 6, where it has been shown by chain-dotted lines that the advance cam 3 and the dial 12 are offset, with respect to the rewind cam 2 and the disc 11, by a fresh quantity indicated by the angle $a$ and corresponding to the second recording.

The same operations are repeated at the end of each dictation, the return movement of the mechanism being each time limited to the commencement of the last recording made, until finally the advance cam 3 strikes against the button 26 of the advance switch 16 by means of its nose 24 at the end of its travel, which switch then acts in order finally to stop the mechanism, as the recording capacity of the machine has then been reached. At this position corresponding to the end of travel, the angular displacement or offsetting between the two cams 2 and 3 is at its maximum value. All the successive dictations have been placed in reserve or blocked, it having been possible for each of them to be individually repeated, as has just been described.

In order to permit the continuous reading of all the texts which have been dictated, it will be sufficient if the disc 11 is caused to turn towards the left in a single movement until the two indexes 18 and 19 have again been brought into coincidence. The cams are then found in a position similar to the position shown in solid lines in Figure 5, or, if the total capacity of the machine has been exhausted, identical to the position of Figure 7. It is then possible to cause the complete rewinding of the magnetic wire by pressing the "rewind" key of the machine, this movement being stopped when the nose 23 of the return cam 2 again strikes against the button 25 of the rewind switch 15 (see Fig. 3).

It will be seen that the particular shape given to the two cams limits the ineffective angle $m$ to a very small value, this corresponding only to the width of the narrowest part of the rewind cam 2, increased by the diameter of the pin 14.

In the form of operation which has been set forth, the freeing of the blocked recordings requires the return movement of the apertured disc 11, this being carried out manually. According to one modification of the operation of the invention, applicable when the dictating machine is equipped for remote control by the secretary, the latter will be able to cause the unblocking of the text to be effected by remote control in the event of the person dictating having omitted to return the disc 11 as far as its stop. This result is obtained, on the one hand, by providing a third switch 28 in series with the rewind switch 15, and on the other hand, by providing the advance cam 3 with a second nose 29 identical with that of the rewind cam (see the outline shown in chain-dotted lines in Fig. 2).

The operation of this auxiliary device is as follows:

Let it be assumed that all the dictations are blocked (obviously with the exception of the last). The secretary may remotely control the rewind by closing a special contact which short-circuits the switch 15. The rewind cam 2, at the end of the travel corresponding to the last recording, will normally act as above described on the button 25 of the rewind switch 15. However, the latter will then remain inoperative, the shaft 1 continuing to rotate towards the right because of the light frictional mounting of the cam 2 on the said shaft. At the end of the travel, the supplementary nose 29 of the advance cam 3 will contact the lever 30 of the third switch 28, as shown in Fig. 3a, said lever 30 extending through an elongated hole 31 of the support 10'.

The rewinding operation will thus be interrupted by the control of this third switch 28 practically at the moment when the advance cam 3 strikes by means of its part 22 on the body of the advance switch 16. All the mechanism is thus returned to zero and the secretary may thus hear all the recordings.

It has been mentioned that the device according to the invention could also be used as a timing mechanism. To this end, the following modification is applied to the mechanism described and illustrated herein. The friction ring 8 which drives the two cams is no longer connected by the pin 9 of the driving shaft of the metering mechanism, but is itself coupled to this shaft by means of any suitable clutch or friction member. On the contrary, this ring may then be fast with one of the two cams.

As has already been set out above, the invention is not in any way limitated to the particular application described and illustrated herein. It will be seen that also the shape, the proportions and even the relative positions of the different members of the mechanism will be able to differ to a large extent from those indicated without thereby departing from the scope of the invention, particularly if the device is adapted to be used in connection with recording devices using a tape or wire, or even those using a disc, sheets, sleeves or other supports.

I claim:

1. Differential metering mechanism with pre-selection, designed for measuring and fractionating any desired quantities, and particularly applicable to dictating machines, essentially characterised by the combination of two switches with two control cams mounted with light friction on the same shaft, the rotation of which is controlled by the movement to be checked, and two discs for operating and recording purposes, each being fast in rotation with one of the two cams, one of which cams actuates the corresponding switch at the end of its travel and the other cam operates the other switch at the end of its travel in the opposite direction.

2. Differential metering mechanism according to claim 1, characterised in that one of the cams is referred to as a rewind cam, co-operates with a switch referred to as a rewind switch and is fast in rotation with an operating disc which has a plurality of holes and of the automatic telephone type, while the other cam, referred to as the advance cam, co-operates with the other switch, referred to as the advance switch, and is fast in rotation with a recording dial carrying a scale in units of the quantity in question.

3. Differential metering mechanism according to claim 1, characterised in that the advance cam is made fast with the recording dial by a pin, while the rewind cam is disposed between the advance cam and the said dial, the said rewind cam comprising a portion of as small a width as possible in its zone corresponding to the path of the pin in such a manner as to reduce to the maximum the ineffective angle to be deducted from the 360° of rotation on which all the recording is effected.

4. Metering mechanism according to claim 3, characterised in that the two cams are symmetrical as regards the operative portions thereof, the blank intended to form the rewind cam being given a recess producing the narrow portion mentioned in claim 3.

5. Metering mechanism according to claim 1, characterised in that the cams each comprise a nose by which they act on the button of the corresponding switch and an inclined portion by which they bear at the other end of their travel against a fixed stop.

6. Metering mechanism according to claim 5, characterised in that the fixed stops are formed by the actual casings of the two switches.

7. Metering mechanism according to claim 1, characterised in that the two switches are inclined in such manner that the cams normally act on their buttons at their corresponding extreme position defined by the ineffective angle.

8. Differential meter with pre-selection according to claim 1, characterised in that the device by which the cams are mounted with light friction comprises a ring of fibre or other similar material interposed between the two cams, which are applied resiliently to the said ring, the latter being fast in rotation with the shaft of the device.

9. Metering mechanism according to claim 8, characterised in that when it is used as a timer, the fibre ring is itself frictionally mounted on the shaft and may be fast with one of the two cams.

No references cited.